March 6, 1962
N. LESSER
3,024,314
REVERTING CALL AUTOMATIC LOCK-OUT
Filed Aug. 18, 1958
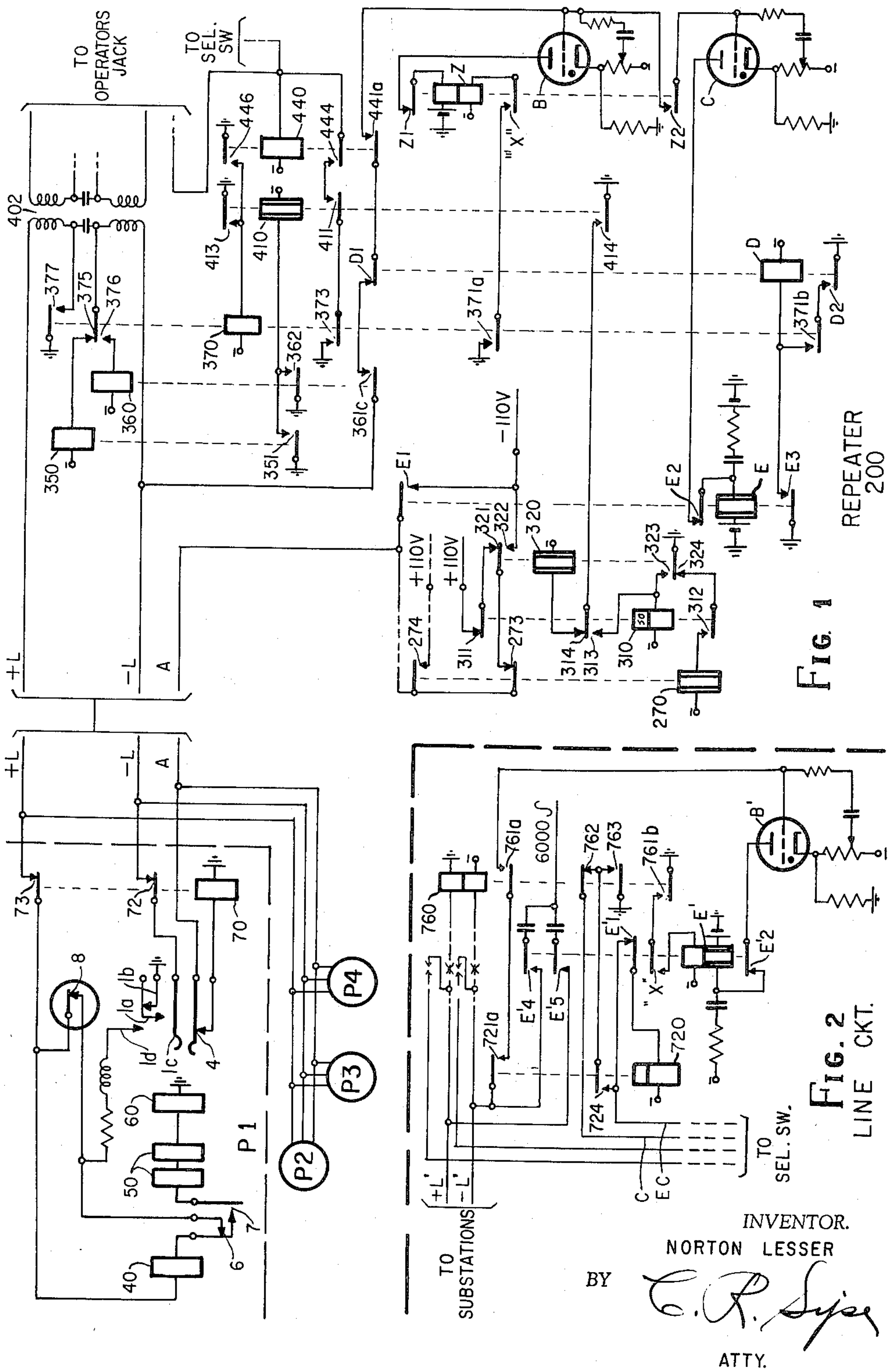
FIG. 1, FIG. 2 LINE CKT.
INVENTOR.
NORTON LESSER
BY C. R. Sipe
ATTY.

United States Patent Office 3,024,314
Patented Mar. 6, 1962

3,024,314
REVERTING CALL AUTOMATIC LOCK-OUT
Norton Lesser, Chicago, Ill., assignor to Automatic Electric Laboratories, Inc., a corporation of Delaware
Filed Aug. 18, 1958, Ser. No. 755,654
15 Claims. (Cl. 179—17)

The present invention relates in general to a telephone party line lock-out arrangement for use in reverting calls and more particularly relates to an arrangement wherein all party line stations except party line stations participating in a reverting call are automatically locked-out in response to the completion of the reverting call.

In a typical party line lock-out arrangement a lock-out relay is provided at each station on the party line. On initiation of a call from one of the stations the lock-out relay at each non-calling station is operated to disconnect the respective station or subset from the line. The calling party may thus complete his call without interference from any other party or subscriber on the party line. After the call is ended, the lock-out relay at each non-calling station is returned to its normal condition, and any station is permitted to initiate or receive a call.

If the calling party desires to make a reverting call, he dials a special digit or digits to reach a reverting call switch, or an operator as the case may be. Then, after dialling one or more digits corresponding to the desired party or informing the answering operator of the situation, as the case may be, the calling party hangs up. The lock-out relay at each non-calling station is then returned to its normal condition to reconnect each subset to the line under automatic control of the central office equipment or under control of an operator as the case may be. With all of the subsets connected to the party line, ringing current corresponding to the desired party is effectively applied to the line to signal the called party. The calling party may likewise be signalled and/or wait until he believes the called party has answered. When both parties have removed their handsets, a talking circuit is completed, and the conversation proceeds to termination.

It will be noted that in the described arrangement the lock-out function takes place when the subscriber initiates a call, and that the central office equipment must unlock the non-calling stations to permit completion of a reverting call. After having unlocked the non-calling stations to permit completion of the reverting call, the central office equipment is not again permitted to automatically operate the lock-out relays, as it has no means for determining whether one or two parties are on the line.

In the present invention each station on the party line is arranged to provide a momentary ground pulse or signal to one side of the line in any well-known manner, whenever the hookswitch thereat is operated by removing or replacing the handset at the station. The time duration of the ground pulse is short, so that the line relay at the central office cannot operate in response thereto, but is long enough to fire a gas tube, which, as is well-known, requires considerably less time for ionization than a relay needs for operation. The ground pulse is applied to the line or initiation of a call but is ignored, as the tube is not connected to the line, unless a line loop has been completed to the line relay individual to the party line.

In one embodiment of the invention the line relay individual to the party line is maintained in the line loop whenever a station is on the line. The ground pulse occurring when the calling party hangs up to permit the reverting call to be completed, is effective to fire one tube. This prepares a circuit to a second tube which is further prepared after the line loop is again completed by one of the parties answering the reverting call. The second tube is then fired by the ground pulse occurring, when the second party answers the reverting call.

In the other embodiment, the line relay individual to the party line is omitted from the line loop in response to the extension of a call and reinserted in the line loop only after one of the parties to the reverting call has answered the call. Only one tube is provided. The tube is then connected to the line when the line relay is reinserted in the line loop. It fires in response to the momentary ground resulting from the second party operating his hookswitch.

The tube firing, as a result of the second party to the reverting call operating his hookswitch, operates means for controlling the lock-out relay at each party line station, which is not participating in the call. The two subscribers on the same party line may then converse without interference from other parties on the line.

It is, therefore, an object of the present invention to provide automatic lock-out service for a party line when a reverting call is completed from a party line station.

It is a further object of the present invention to provide equipment at a central office which automatically recognizes that the two parties participating in a reverting call are on the line.

It is still another object of the present invention to provide different types of automatic party line lock-out service dependent on the type of call being completed by a subscriber on the party line.

A feature of this invention is the arrangement whereby the central office equipment determines that two parties on one line are participating in a reverting call and a further feature is the arrangement for locking-out the non-participating stations.

Further objects and features of this invention will be noted from the following specification, claims, and attached drawings.

FIG. 1 of the drawings illustrates the invention, as applied to a paystation party line with lock-out as described in United States patent application number 448,-268, now Patent Number 2,904,633, filed August 6, 1954 by Lomax, hereinafter referred to as the first application, in which each station on the party line has a lock-out relay operated by a high voltage.

FIG. 2 illustrates the invention as applied in a system wherein a lock-out relay operated by a tone signal is provided at each station on a party line, as disclosed in United States patent application No. 638,940, filed February 8, 1957 by Lomax, hereinafter referred to as the second application.

The drawings incorporate as much of the respective disclosed systems as necessary for the understanding of the manner in which the invention functions, and wherever feasible, such portions are given reference characters corresponding to those used in the respective applications. This permits easy reference to be made to corresponding portions of the respective applications.

At each party line station the conventional hookswitch contact arrangement is modified in any well-known manner by the addition of hookswitch springs *1a* and *1b*. Whenever the handset is removed from its cradle, a momentary ground is applied to the —L side of the line as spring *1c* moves to separate spring *1a* from *1b*, before closing to spring *1d*. Springs *1c* and *1d* on closing prepare or complete the line loop. With spring *1b* made quite stiff, it will separate from spring *1a* in considerably less than the usual 15 millisecond period necessary to operate a line relay. Likewise when the handset is replaced, a momentary ground pulse is applied to the —L side of the line as springs *1b* and *1a* close before springs *1a* and *1c* open.

In FIG. 1 a party line paystataion P1, showing only such details of the paystation described in the first application as believed necessary to understanding the invention, together with similar paystations, indicated by circles marked P2, P3, and P4 are connected to the +L and −L line conductors extending to Repeater 200 at the central office. As described in the first application, Repeater 200 is individual to the party line to which the paystations are connected. Each paystation has a polar relay 70 with a stay-put armature which is operated to one of two positions when a high voltage is extended over conductor A to the relay. Normally each polar relay is in its unlocked position so that its associated subset is connected to line conductors +L and −L.

When a call is initiated and a coin deposit made, relay 350 is operated. It connects relay 360 in the line loop to the calling party and also prepares a connection from the grid of the tube B to the −L conductor. Relay 360 is thereafter maintained operated over the line loop, as long as the station handset is removed from its cradle. The polar relay at each non-calling station is operated by a high voltage transmitted from Repeater 200 over conductor A. The polar relay at the calling station does not operate, as hookswitch springs 4 thereat are open. The +L and −L conductors are disconnected from the subsets at the non-calling stations by each respective operated polar relay thereby preventing interference by other subscribers and providing secret service to the calling station.

After the subscriber has made the proper coin deposit, he is permitted to operate the switching equipment. As explained in the aforementioned first application, a selector switch individual to the repeater is provided for extending the call. If the switch is operated to a special level indicative of a reverting call, it returns a ground potential to operate relay 440. This signals an operator, who has access to the Repeater 200 via a jack individual thereto. Relay 440 also connects the grid of tube B to the −L line conductor.

On plugging her cord circuit into the jack, a talking circuit is completed to the calling party, and on securing the called party's number, the calling party is instructed to hang up. The calling party on replacing his handset applies a momentary ground to the −L conductor to fire tube B and thereby operate relay Z. Relay Z prepares a connection for the grid of tube C to the −L conductor and extinguishes tube B. A high voltage unlocking potential is applied to the conductor A to operate the lock-out relay at each station to connect the associated subset to the party line. Ringing current is then applied to the line to signal the called and calling party all as described in the first application.

When the first of the two parties lifts his handset, a line loop is completed to relay 360, which connects the grid of thyratron tube C to the −L line. The momentary ground pulse appearing on the −L line, when springs 1*c*, 1*a* and 1*b* close, is ineffective, as contacts 361*c* are open until relay 360 has had time to operate. When relay 360 operates, the grid of tube C is connected to the −L line conductor.

When the second party lifts his handset to complete the talking circuit, the momentary ground resulting from the closure of springs 1*c*, 1*a* and 1*b* at his station is extended to the grid of tube C. It fires to operate relay E. A high voltage lock-out potential is then transmitted over conductor A to operate the lock-out relay at each station which is not participating in the call. This provides secret or lock-out service to the two conversing parties.

In FIG. 2 a portion of the line circuit individual to a party line, as described in the second application, is shown. As described in the second application, a subscriber initiating a call completes a circuit to the line relay 760, and after a finder finds the calling line a 6000 cycle tone signal is returned over the line conductors from the line circuit. The tone signal operates a lock-out relay at each non-calling station to effectively disconnect those stations from the line. Line relay 760 is restored, when the finder and its associated selector are connected to the calling line. It the call is a reverting call, the selector is stepped by dial pulses to connect to a reverting call switch. On switching through to the reverting call switch relay 720 is operated by ground on the EC lead. It removes the 6000 cycle tone from the line and each lock-out relay at the non-calling station connects its subset to the line. Thereafter the desired number is dialled into the reverting call switch.

When one of the two parties lifts his handset, the line loop is completed to a relay in the reverting call switch. The switch restores to recomplete the line loop to relay 760. Relay 760 is reoperated as described in the second application. It connects tube B′ to the −L conductor. The momentary ground resulting from the closure of springs 1*c*, 1*a* and 1*b*, when the first party answers the call, is ineffective to operate any apparatus. When the second party lifts his handset, the ground resulting from the closure of springs such as 1*c*, 1*b* and 1*a* thereat is extended to the grid of tube B′.

The tube B′ fires to operate relay E′, which provides 6000 cycle tone to the line conductors. This operates the lock-out relay at each non-participating station to provide lock-out or secret service for the two talking parties.

It will be noted that, although the tubes mentioned above are referred to as gas tubes or thyratrons, that the invention is not limited thereto as any well-known types of electric devices may be used such as vacuum tubes, or transistors, for example. It will be further noted that if desired an oscillator can be substituted for the ground at spring 1*b*. The oscillations momentarily provided thereby, when the hookswitch is operated, do not operate the line relay. The line relay operates over the normal loop circuit therefor. At the central office a detector and amplifier arrangement can be connected to the line under control of the line relay in one of the described manners for the purpose of detecting the oscillations. Thus on a reverting call the number of bursts of oscillations can be counted in one of the manners described herein to operate means for providing lock-out service.

Referring now to FIG. 1, a subscriber at paystation P1 on initiating a call lifts his handset, and hookswitch springs 1*b*, 1*a*, and 1*c* are closed briefly to extend a momentary ground over contacts 72, the −L conductor, the lower left winding of repeating coil 402 and contacts 375 to relay 350. As spring 1*c* continues to move, it quickly separates springs 1*a* from 1*b* to remove ground from the −L conductor. Relay 350, which corresponds to relay 350 in the first application, does not operate from the momentary ground on the −L conductor. Hookswitch spring 1*c* closed to spring 1*d* to prepare a circuit for relay 350. This circuit is completed when the subscriber makes his coin deposit. When the subscriber operates his hookswitch, springs 4 also open to disconnect polar relay 70 from conductor A.

On deposit of a coin, contacts 7 close to extend the ground at the right of relay 60, through coin magnet 50, past restoring magnet 40, dial springs 8, the paystation coils and transmitters indicated by the coil and resistance connected to spring 1*d*, springs 1*d* and 1*c*, contacts 72, the −L conductor, the lower left winding of repeating coil 402 and contacts 375 to operate relay 350 in a manner similar to that explained in the first application.

Relay 350 operates to close contacts 351 and operate slow-to-release relay 410. Relay 410 closes contacts 413 to operate relay 370. At contacts 411 relay 410 prepares a circuit for relay 440, and at contacts 414 completes a circuit over contacts 314 to slow-to-release relay 320. Relay 320 operates to open contacts 321 and close contacts 322. This forwards −110 volt lock-out potential over contacts 273, conductor A and hookswitch springs such as 4 at each non-calling station to the lock-out relay such as 70 at each non-calling station. The respective lock-out relays operate to open contacts such as 72 and 73 at each non-calling station, and thereby disconnect the respective station or subset from the line.

At contacts 323 relay 320 completes a circuit for slow-to operate relay 310. Relay 310 opens contacts 311 to open a point in a circuit for applying +110 volt unlocking potential to conductor A. At contacts 314 it opens the circuit to relay 320, and at contacts 313 completes its own holding circuit from contacts 414. At contacts 312 relay 320 prepares a circuit for slow-to-release relay 270. Relay 320 restores after a period of time to open contacts 322 and remove the −110 volts from conductor A. At contacts 323 it opens the original circuit for relay 310, which remains operated over its holding circuit. At contacts 324 a circuit is now completed over contacts 312 for relay 270, which operates to open contacts 273 and close contacts 274.

At contacts 373 relay 370 prepares a holding circuit for relay 440, and at contacts 375 opens the circuit to slow-to-operate relay 350. Relay 350 opens the circuit to relay 410 at contacts 351 and relay 410 starts to restore. A circuit is prepared to the lower winding of relay Z at contacts 371*a*, and at contacts 371*b* a circuit is prepared to relay D. At contacts 376 battery through the winding of relay 360 is connected to the lower left winding of repeating coil 402 and the −L conductor. At contacts 377 ground is connected to the +L conductor and over the line loop including the dial springs 8, as explained in the first application, to operate relay 360.

Relay 360 closes contacts 362 to provide an energizing circuit for relay 410, before it can restore. At contacts 361*c* a connection from the grid of thyratron B is prepared to the −L line.

The subscriber operating the dial springs in accordance with the first digit of the called number pulses relay 360. This steps a selector switch (not shown) individual to the Repeater 200 as explained in the first application. If the call is to a subscriber on another line, the switch extends the call in response to the operation of the dial in a manner described in the first application. In the event of a toll call or reverting call, the selector switch is stepped to a special level, and ground is returned from the selector switch in a manner explained in the first application to operate relay 440.

Relay 440 closes contacts 446 to complete another circuit for relay 370, and at contacts 444 completes a holding circuit for itself over contacts 411 and 373. At contacts 441*a* it connects the grid of tube B past contacts D1 and 361*c* to the −L line. As the potential on the −L line is substantially negative at this time, tube B does not fire.

Relay 440 lights a lamp (not shown) to signal an operator having access to Repeater 200. The operator, on plugging into the jack (not shown), completes a talking circuit to the calling party via repeating coil 402 as explained in the first application. After securing the called party's number, the operator instructs the calling party to hang up if this is a reverting call.

The calling party on replacing his handset separates springs 1*d* and 1*c* to open the circuit to relay 360. Before relay 360 can restore its contacts, springs 1*a* and 1*b* close to extend ground over spring 1*c* and substantially raise the potential on the −L line. The ground pulse is applied past contacts 361*c*, D1, and 441*a* to the grid of tube B, and the thyratron tube B fires. Relay 360 restores its contacts shortly, and contacts 361*c* open, but the thyratron tube remains conductive in accordance with its well-known characteristics. The upper winding of relay Z operates in series with tube B and closes its "X" contacts to energize its lower winding. It also opens the energizing circuit for its upper winding and tube B at contacts Z1, and at contacts Z2 extends the grid of thyratron tube C to contacts 441*a*.

The operator applied +110 volt unlocking potential over contacts 274 to conductor A, as explained in the first application. This operates the respective lock-out relays to connect each subset to the +L and −L line conductors. The operator then applies the appropriate ringing frequency current to the line to signal the called party as explained in the first application.

The called or calling party on removing his handset, recompletes the loop to relay 360, which operates. The momentary ground resulting from the temporary closure of springs 1*c*, 1*b* and 1*a* is extended to the −L conductor, but is not effective, as contacts 361*c* are open, due to relay 360 not being operated until springs 1*c* and 1*d* are closed. When the other party to the reverting call removes his handset, a momentary ground is applied from springs such as 1*a*, 1*b* and 1*c* to the −L conductor as explained. With relay 360 operated, the ground is extended past contacts 361*c*, D1, 441*a*, and Z2 to the grid of thyratron tube C. Tube B remains unaffected as its cathode to another circuit is open at contacts Z1. Tube C fires to operate slow-to-release relay E in series therewith.

Relay E closes contacts E1 to apply −110 volt lockout potential to conductor A. This operates the lockout relay at each respective non-participating station to lock-out or disconnect the respective subsets from the line. Relay E opens its own and the circuit for tube C at contacts E2, and at contacts E3 completes an operating circuit for relay D. Relay E holds its contacts operated for a time period determined by the slow-to-release characteristics of relay E and the time constant of the condenser resistor network connected thereto. Relay D disconnects the grid of thyratron tubes B and C respectively from the line at contacts D1, and at contacts D2 completes its own holding circuit over contacts 371*b*.

The operator, on hearing the calling parties on the line, removes her plug from the jack to open one circuit holding relay 440 operated. The conversation now proceeds to termination. As each party replaces his handset, a momentary ground pulse appears on the −L conductor as before explained. As contacts D1 are open, no apparatus is affected by the pulses. Relay 360 restores when the last party has replaced his handset to open the line loop. It opens contacts 362 to open the circuit to relay 410. At contacts 361*c* it opens a point in the connection extending from the −L conductor to contacts D1. Coin collect potential is applied to the line to operate the coin magnet 50 at the station for collecting any deposited coin as explained in the first application.

Relay 410 restores after a period of time to open one circuit for relay 370 at contacts 413. At contacts 411 the holding circuit for relay 440 is opened, and as the operator has opened the other circuit for relay 440, it restores. Restoration of relay 440 opens the other circuit for relay 370 at contacts 446. A further point in the connection between the grid of thyratron tube B and the −L conductor is opened at contacts 441*a*. At contacts 414 relay 410 restores relay 310. Relay 370 on restoring opens the circuit to the lower winding of relay Z at contacts 371*a*, and at contacts 371*b* opens the circuit to relay D. Both relays Z and D restore.

Relay 310 on restoring closes contacts 311 to extend +110 volt unlocking potential over contacts 321. At contacts 312 the circuit to relay 270 is opened, and it restores to extend the +110 volt unlocking potential over contacts 273 to conductor A for operating the lock-out relay at each station to connect the respective subsets to the +L and −L conductors.

A call extending to a station on another line proceeds as described in the first application. As relay 360 is in the line loop to the calling party, relays 410 and 370 are operated, however in this case relay 440 is not operated. The ground pulse resulting from replacing the handset at the termination of the call is therefore not extended to the grid of tube B. The equipment therefore restores on the termination of the call, as described in the first application.

When the calling party replaces his handset, in the case of an incomplete reverting call or in case of a toll call, wherein relay 440 is operated, the momentary ground fires tube B and relay Z operates. However, release of relay 360 together with the operator removing her plug, causes release of relays 410, 440 and 370, as described. Contacts 371*a* open, resulting in the restoration of relay Z. Unlocking +110 volt is forwarded as before described over conductor A.

Referring now to FIG. 2, the invention will be described in conjunction with the party line lock-out arrangement using a 6000 cycle tone for locking out non-calling parties, as disclosed in the second application. The station circuits, which are not shown, are equipped as described in the second application. In addition each station has a hookswitch arrangement for providing a momentary ground to the −L line conductor as explained for the station P1 in FIG. 1. As described in the second application, the calling party line subscriber operates line relay 760 on initiating the call. Thereafter, a finder-selector link (not shown) is associated with the calling line, and the +L′ and −L′ conductors are extended to the selector line relay, while relay 760 is restored. As explained in the second application, a 6000 cycle tone is placed on the +L′ and −L′ line conductors by a relay (not shown) in the line circuit to lock out the non-calling stations, when the finder finds the calling line.

If the subscriber is extending a reverting call, the selector switch is operated in response to dial pulses to connect the +L and −L conductors to a reverting call switch (not shown) and a marking is returned over lead EC to operate relay 720 on operation of the selector switch through relay, as explained in the second application. Relay 720 locks operated over contacts E′1, 724 and 762 to ground returned by the switch train over lead C. It cuts off the 6000 cycle tone from the line conductors to cause the subset at each respective locked-out station to be connected to the line, all as explained in the second application. The digit corresponding to the called station on the party line is now dialled into the reverting call switch.

The calling party replaces his handset to cause the reverting call switch to return ringing frequency current corresponding to the called station over the +L′ and −L′ leads for signalling the called station. The momentary ground, extended on replacement of the handset, is ignored at the reverting call switch, as no apparatus is provided thereat for responding thereto.

When the first party answers, the ringing current is cut off and a reverting call tone is supplied to the line from the reverting call switch. The tone informs the called party that he has answered a reverting call. The momentary ground extended, as a result of the answer, is ineffective to operate any equipment at the reverting call switch. The reverting call switch and the preceding finder-selector link are released in response to one of the parties answering the reverting call and relay 760 is reoperated over the line loop, all as explained in the second application.

Relay 760 disconnects relay 720 from the C lead at contacts 762, and provides a holding ground therefor at contacts 763. At contacts 761*b* relay 760 prepares a circuit for the upper winding of relay E′. With relay 720 and 760 operated the grid of thyratron tube B′ is now connected via contacts 721*a* and 761*a* to the −L′ conductor. The second party, on answering the call, extends momentary ground over the −L′ conductor, past contacts 721*a* and 761*a* to the grid of thyratron tube B′. The tube fires and operates the lower slow-to-release winding of relay E′ in series therewith.

Relay E′ energizes its upper winding over its "X" contacts and contacts 761*b*. Relay E′ opens contacts E′1 to restore relay 720. At contacts E′2 it opens the circuit to its own lower winding to deenergize the winding and extinguish tube B. At contacts E′4 and E′5 the 6000 cycle tone is extended over the line conductors +L′ and −L′ to operate the lock-out relay at each non-participating station. Relay 720, on restoring, opens contacts 721*a* to disconnect to the grid of tube B′ from the line conductors.

On restoration of the connection relay 760 is restored as the line loop is opened. It opens contacts 761*b* to restore the upper winding of relay E′. At contacts 761*a* it further disconnects the grid of tube B′ from the −L′ conductor, and at contacts 763 it opens another point in the circuit to relay 720. Relay E′ restores to open contacts E′4 and E′5 to remove the 6000 cycle tone from the line conductors to unlock the locked out stations.

The described several arrangements are merely illustrative of the inventive concept, which is believed to be more fully covered in the accompanying claims.

What is claimed is:

1. In combination, a party line, a plurality of stations on said party line, a lock-out relay at each station for disconnecting its respective station from said party line, switching equipment for extending a call from a calling station on said party line, said switching means further effective to the removal of the receiver at said calling station for controlling the lock-out relay at each non-calling station to disconnect each respective non-calling station from said party line, means effective on a reverting call to a called station on said party line for controlling said lock-out relays to reconnect said non-calling stations to said party line to enable signalling of said called station, and means effective only to the removal of both the calling and called stations' receivers on said party line for controlling said lock-out relay at said non-calling and non-called stations for disconnection thereof from said party line.

2. In a combination such as claimed in claim 1, means for controlling the lock-out relay at each other station on termination of said connection to connect each other station to said party line.

3. In a combination such as claimed in claim 1, a coin receiving arrangement at each station, and means for preventing the operation of said switching equipment unless a coin is deposited in said receiving arrangement at a calling station on said line.

4. In the combination claimed in claim 3, means for operating the lock-out relay at each non-calling station responsive to the deposit of a coin at said calling station.

5. For use with a party line having a plurality of stations each having a lock-out relay for disconnecting the respective station from the party line, means for controlling the lock-out relay at each non-calling station to disconnect each non-calling station from said line in response to a call from one of said stations, means operated in the event said call is a reverting call for controlling the lock-out relay at each non-calling station to connect each non-calling station to said party line, and means automatically operated only in response to both the calling and called stations removing their receivers for completing a connection between said two stations on said party line for controlling the lock-out relay at each non-calling and non-called stations for disconnection thereof from said party line.

6. An arrangement such as claimed in claim 5, in which each station has means for transmitting a momentary signal over said party line, and said automatically operated means comprises an electronic valve connected to said line in response to a station participating in said reverting call, connected across said line, and means operated by said valve responsive to said signal provided on answer of the other station participating in said call for controlling the lock-out relay at each non-participating station.

7. A reverting call lock-out arrangement wherein one station on a party line is arranged to extend a connection to another station among a plurality of other stations on said line, the improvement comprising an electronic valve connected to said party line in response to said one or said other station being connected across said line by the removal of the receiver thereat pursuant to the completion of a reverting call, and means operated by said valve responsive only to both stations being connected across said line by the removal of the receiver thereat for disabling each other non-participating station on said line.

8. In an arrangement such as claimed in claim 7, means operated on initiation of a call by said one station for disabling each other station on said line, and means thereafter operated responsive to the extension of a reverting call for enabling each of said other stations.

9. In an arrangement such as claimed in claim 7, means operated on the initiation of a call and deposit of a coin at said one station for disabling each other station and for permitting the extension of a call from said station.

10. For use on a party line with reverting call service whereby one station on said line after indicating the called station terminates its connection across said line to permit the called station to be signalled, the improvement comprising a lock-out arrangement, first means for operating said lock-out arrangement, means operated responsive to a station answering said reverting call for preparing said first means, and means operated responsive to a second station answering said reverting call for operating said first means for operating said lock-out arrangement to disable each non-participating station.

11. An arrangement such as claimed in claim 10, in which said preparing means comprises a line relay connected to said party line, and said first means comprises an electronic valve.

12. A party line having a plurality of stations thereon each having a lock-out arrangement for disabling the respective station in response to the operation of the hookswitch springs at one of the other respective stations and each having means for extending a momentary signal over said party line in response to the operation of the respective hookswitch springs, the improvement comprising means for controlling the lock-out arrangement at each non-calling station in response to the operation of the hookswitch springs at a calling station, switching equipment operated from said calling station for enabling the extension of a call to another station on said line whereafter said calling station terminates said call to permit the signalling of said other station, and means operated by said momentary signal in response to only both said calling and called stations operating the respective hookswitch springs thereat for controlling the lock-out arrangement at each other non-participating station to disable each respective other non-participating station on said party line.

13. For use with a party line having a plurality of stations each equipped with a lock-out relay for disconnecting its respective station from said party line and means for providing a momentary signal to said line in response to the operation of the hookswitch springs at each station, a line relay individual to said party line, operated in response to the completion of a line loop over said line on initiation of a call from one of said stations, means operated in response to the operation of said line relay for controlling the lock-out relay at each non-calling station to disconnect each non-calling station from said party line, means operated on termination of said call for controlling said lock-out relays to connect the respective stations to said party line, means operated in response to a reverting call from one station on said party line for controlling said lock-out relays to connect the disconnected stations to said party line, and means thereafter controlled by said momentary signal responsive only to the operation of the hookswitch springs at both the one and a called second station answering said reverting call for controlling said lock-out relays to disconnect each non-participating station from said party line.

14. In combination, a party line with a plurality of stations thereon, a lock-out arrangement for each station for disconnecting the respective station from said line responsive to a control signal extended to said party line, a line relay individual to said line and operated responsive to the initiation of a call from one of said stations, means for disabling the lock-out arrangement at said calling station responsive to the initiation of a call therefrom, means thereafter operated for extending a control signal to control the lock-out arrangement at each non-calling station for disconnecting each respective non-calling station from said line, switching equipment, means operated responsive to the operation of said switching equipment in accordance with a reverting call for controlling the lock-out arrangement at each non-calling station to connect each non-calling station to said line, means thereafter effective for signalling the called station on said party line in response to said reverting call, and means operated in response only to the answering of both the calling and called stations on said party line for completion of said reverting call and for operating the lock-out relay at each station not participating in said reverting call to disconnect the non-participating stations from said party line.

15. A two-conductor party line having a plurality of more than two stations connected thereto each having dial means for operating central office switching equipment common to a plurality of lines for extending a connection from said two-conductor line, a lock-out arrangement at each station, a hookswitch arrangement at each station whereby a momentary signal is transmitted over one of said conductors to said central office by a calling station and said lock-cut arrangement at the respective non-calling stations are operated to disable said non-calling stations responsive to the removal of the handset at said calling station from its respective cradle, said hookswitch springs also arranged to complete a line loop over said two-conductor line after the extension of said momentary signal, means in said central office responsive to the completion of a line loop by one of said stations for operating the lock-out arrangement at each other station on said party line to disable said other stations, means operated by said switching equipment for again operating the lock-out arrangement at all non-calling stations to enable the same and for signalling a called party on said line in response to a particular number dialled by said calling station and the replacement of the handset at the calling station in its cradle, and means operated by said momentary signal responsive only to both the removal of the handset at a second called station and said calling station to answer said reverting call for operating the lock-out arrangement at the other non-participating stations on said party line to again disable said other non-participating stations.

References Cited in the file of this patent

UNITED STATES PATENTS

| | | |
|---|---|---|
| 1,930,921 | Brandt | Oct. 17, 1933 |
| 2,133,814 | Halligan | Oct. 18, 1938 |
| 2,245,799 | McClew | June 17, 1941 |
| 2,278,548 | Kudrna et al. | Apr. 7, 1942 |
| 2,543,062 | Ringkjob et al. | Feb. 27, 1951 |